(12) United States Patent
Brown

(10) Patent No.: US 8,218,566 B2
(45) Date of Patent: Jul. 10, 2012

(54) SYSTEMS AND METHODS FOR MAKING SERIAL PORTS OF EXISTING COMPUTERS AVAILABLE OVER A NETWORK

(75) Inventor: Andrew Brown, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2037 days.

(21) Appl. No.: 11/245,667

(22) Filed: Oct. 7, 2005

(65) Prior Publication Data

US 2007/0081552 A1 Apr. 12, 2007

(51) Int. Cl.
*H04L 12/66* (2006.01)
(52) U.S. Cl. ......................... 370/463; 370/465
(58) Field of Classification Search .................. 370/463, 370/419, 465
See application file for complete search history.

(56) References Cited

U.S. PATENT DOCUMENTS

| | | | |
|---|---|---|---|
| 5,671,355 A | 9/1997 | Collins | |
| 6,247,644 B1 | 6/2001 | Horne et al. | |
| 6,857,005 B2 | 2/2005 | Kistler et al. | |
| 2002/0184326 A1 | 12/2002 | Thomson | |
| 2004/0078456 A1* | 4/2004 | Kennedy et al. | 709/223 |
| 2004/0128669 A1* | 7/2004 | Furst et al. | 717/178 |
| 2004/0158576 A1* | 8/2004 | Chen et al. | 707/102 |
| 2005/0004974 A1* | 1/2005 | Sharma et al. | 709/202 |
| 2005/0021870 A1 | 1/2005 | Carnahan et al. | |
| 2005/0076152 A1 | 4/2005 | Huppenthal et al. | |
| 2006/0059540 A1* | 3/2006 | Hammons et al. | 726/2 |
| 2007/0081552 A1* | 4/2007 | Brown | 370/463 |

* cited by examiner

*Primary Examiner* — Jianye Wu

(57) ABSTRACT

Systems and methods for making serial ports of existing computers available over a network are disclosed. In an exemplary embodiment the system may comprise a serial controller for locally controlling at least one serial port at a networked computer. A management processor is operatively associated with the networked computer. The management processor operates in a first mode to disable local control of the at least one serial port by the serial controller. The management processor takes control of the at least one serial port for network access.

18 Claims, 4 Drawing Sheets

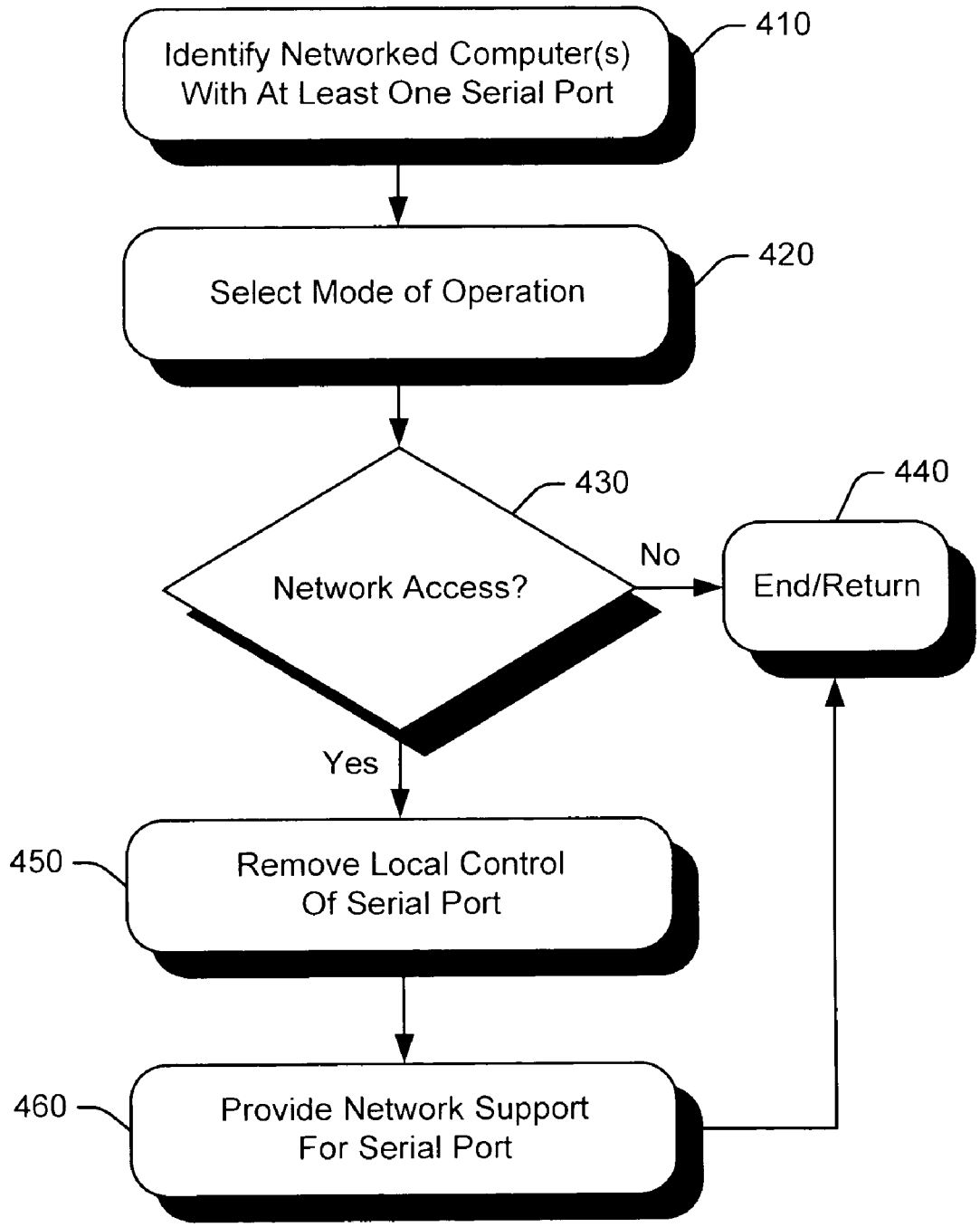

US 8,218,566 B2

SYSTEMS AND METHODS FOR MAKING SERIAL PORTS OF EXISTING COMPUTERS AVAILABLE OVER A NETWORK

TECHNICAL FIELD

The described subject matter relates to computer networks, and more particularly to systems and methods for making serial ports of existing computers available over a network.

BACKGROUND

Serial devices have largely been superseded by the universal serial bus (USB). However, the widespread use of serial devices in the past means that many serial devices are still in use today. Accordingly, computer manufacturers still provide serial ports to interface with these legacy devices.

Serial devices are typically accommodated in network environments by providing dedicated servers, also referred to as "terminal servers," for interfacing between one or more serial device and the network. However, the use of terminal servers is expensive and consumes energy, network ports, and storage space (e.g., on the server rack). Terminal servers may also be inefficiently designed, having too many network ports for the number of serial devices actually implemented on the network.

Alternatively, server computers may be provided with supplemental controllers which operate in conjunction with the universal asynchronous receiver-transmitter (UART) at the server computer to redirect serial port communications onto the network. However, supplemental controllers utilize the server's UART and operating system. Accordingly, if the server computer crashes, is turned off, or otherwise becomes unavailable, the serial port is also rendered unavailable to the network.

SUMMARY

An exemplary embodiment for making serial ports of existing computers available over a network may be implemented in a system. The system may comprise a serial controller for locally controlling at least one serial port at a networked computer. A management processor is operatively associated with the networked computer. The management processor operates in a first mode to disable local control of the at least one serial port by the serial controller. The management processor takes control of the at least one serial port for network access.

In another exemplary embodiment, making serial ports of existing computers available over a network may be implemented as a method, comprising: removing control of at least one serial port from a serial controller at a networked computer, and providing network access to the at least one serial port exclusive of the serial controller.

BRIEF DESCRIPTION OF THE DRAWINGS

FIG. 4 is a flowchart illustrating exemplary operations for making serial ports of existing computers available over a network.

DETAILED DESCRIPTION

Briefly, systems and methods may be implemented for making serial ports of existing computers available over a network. Exemplary systems and methods implement serial port(s) on networked computers (e.g., servers), to reduce or eliminate the need for dedicated terminal servers. A management processor may be provided to remove local control of the serial port from the serial controller of the networked computer. The management processor then makes the serial port(s) available for network access exclusive of the serial controller. In exemplary embodiments, the management processor functions independent of the operating system for the networked computer, enabling network access to the serial port(s) even if the networked computer is powered off or otherwise unavailable.

Exemplary System

Figure 1:
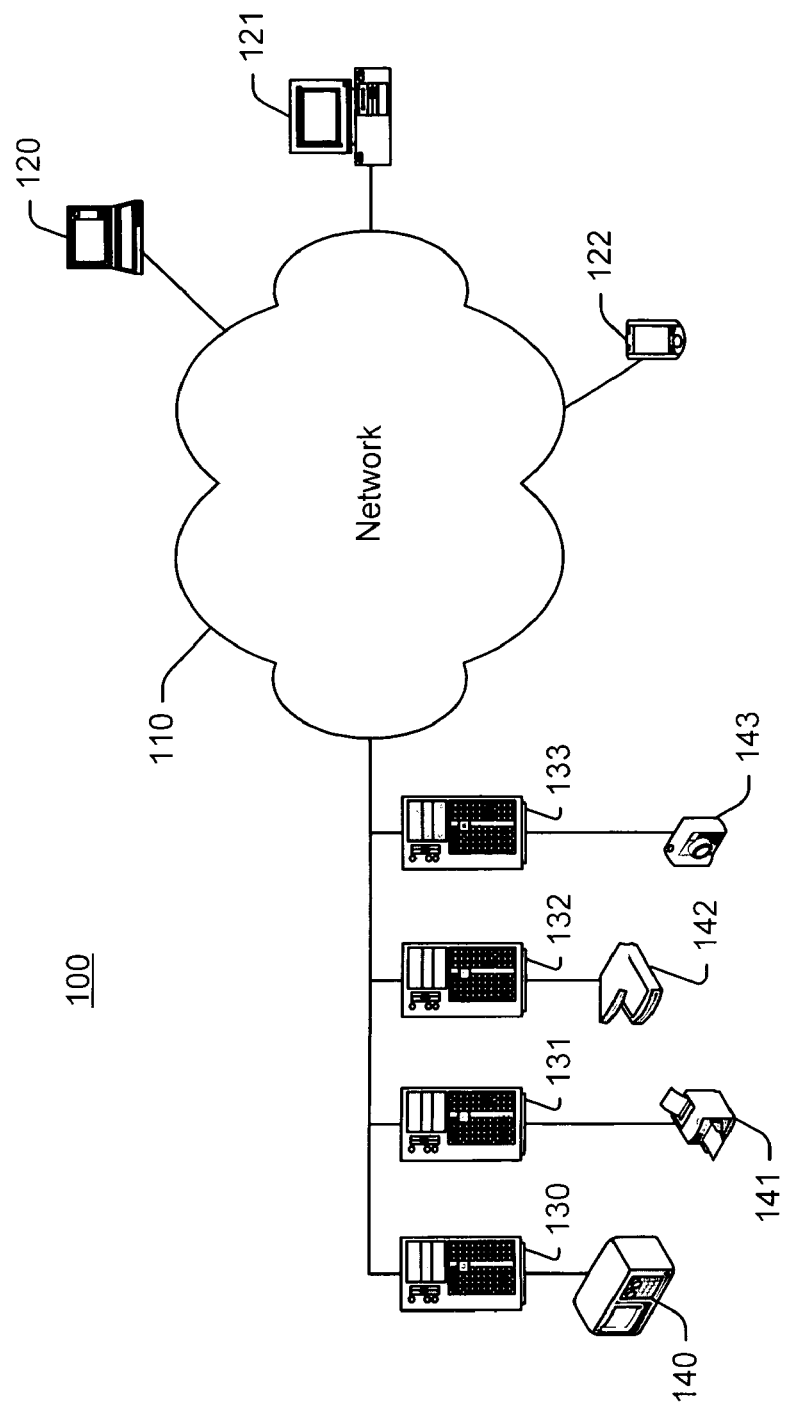
FIG. 1 is a schematic illustration of an exemplary computer network which may be implemented for providing network access to serial ports of existing computers.

FIG. 1 is a schematic illustration of an exemplary computer network 100 which may be implemented for providing network access to serial ports of existing computers. The computer network 100 may include one or more communication networks 110, such as a local area network (LAN) and/or a wide area network (WAN). One or more network devices 120-122 (hereinafter, generally referred to as 120) may be linked to one another over the communication network 110. The number of network devices 120 that may be implemented is limited primarily by the connectivity of the communication network 110.

As used herein, the term "network devices" refers to the hardware and software (the entire computer system) used to access and/or perform various network services. A network device 120 may be implemented as a computer system that also runs other applications, such as, e.g., a desktop or laptop personal computer (PC). Alternatively, a network device 120 may be implemented as an appliance dedicated only to network applications. A network device 120 connects to a network via a communication connection such as, e.g., an Ethernet connection.

Computer network may also include one or more server computers, 130-133 (hereinafter, generally referred to as 130) shown in FIG. 1. In an exemplary embodiment, the server computers 130 may be installed in a rack system, although the server computers 130 are not limited to such a configuration.

Server computers 130 may include one or more serial ports (e.g., serial ports 220a-c in FIG. 2) for connecting one or more serial devices 140-143 (hereinafter, generally referred to as 140). For purposes of illustration, a measurement device 140, printer 141, imaging device 142, and digital camera 143 are shown in FIG. 1 connected to the serial ports of server computers 130. It is noted, however, that any serial device now known or later developed may be connected to the server computers 130 via the respective serial ports.

The systems and methods described herein enable the serial ports of existing computers (e.g., server computers 130) to be made available over the computer network 100. In an exemplary embodiment, a management processor (e.g., management processor 250 in FIG. 2) may be provided to remove local control of the serial port and make the serial port(s) available for network access. Accordingly, other network devices 120 may access the serial devices 140 via the communications network 110.

It is noted that exemplary computer network 100 shown in FIG. 1 and described above is provided for purposes of illustration and is not intended to be limiting. The systems and methods described herein are not limited to use with any particular type or configuration of computer network.

It is also noted that the systems and methods described herein are not limited to use with any particular type or configuration of network devices 120 or server computers 130. Although only server computers 130 are shown in FIG. 1 connected to serial devices 140, in other embodiments, the systems and methods for making serial ports of existing computers available over a network may also be implemented for the serial ports of other network devices 120, such as, e.g., the laptop PC 120 and/or desktop PC 121.

Figure 2:
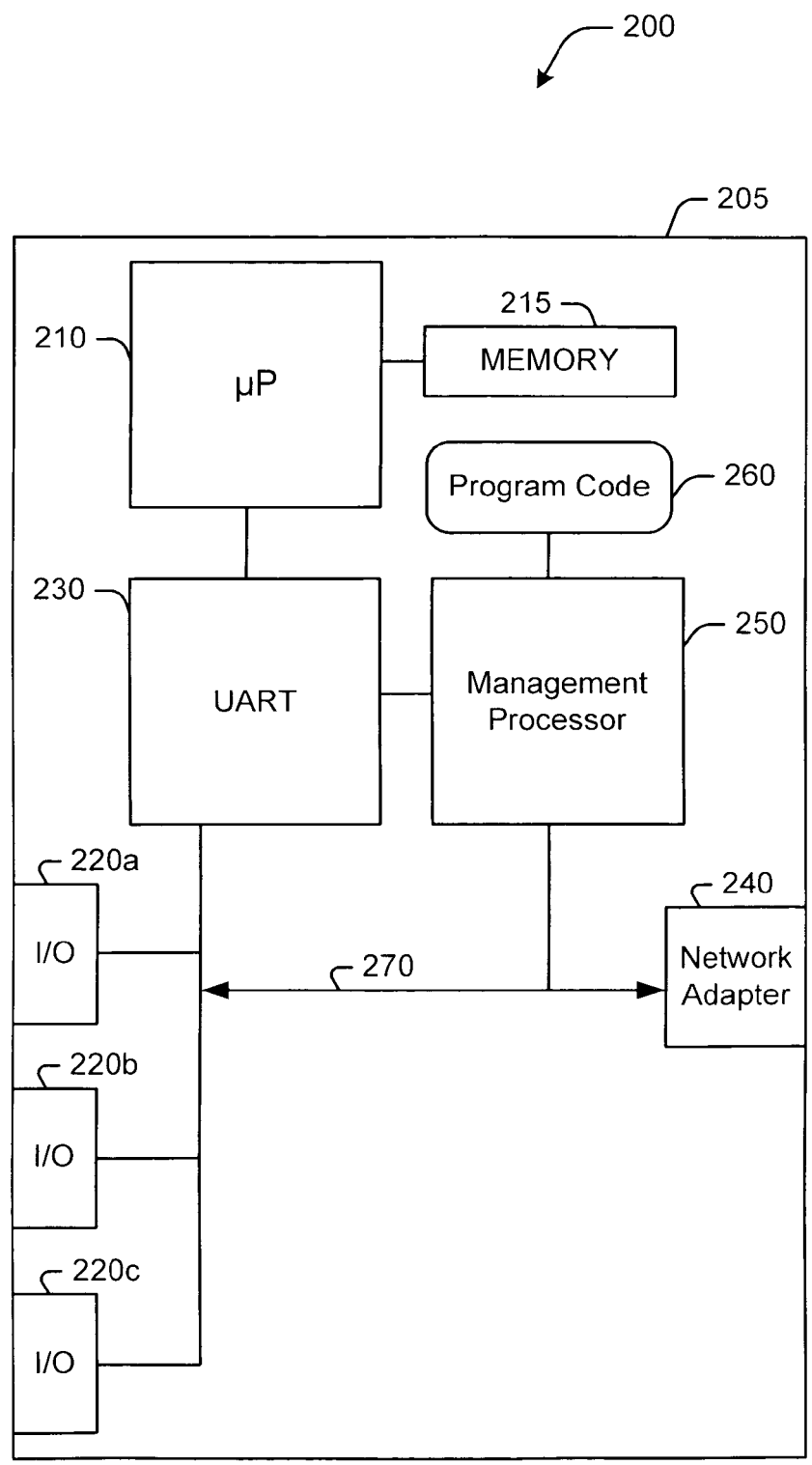
FIG. 2 is a schematic illustration of an exemplary system for making serial ports of existing computers available over a network.

FIG. 2 is a schematic illustration of an exemplary system 200 for making serial ports of existing computers available over a network. The exemplary system 200 is described generally with reference to a networked computer 205. It is noted that the networked computer 205 may be one or more network device (e.g., network devices 120 in FIG. 1) and/or one or more server computer (e.g., server computers 130 in FIG. 1).

Exemplary networked computer 205 may include one or more processors or processing units 210 and a system memory 215. System memory 215 may include, e.g., read only memory (ROM) and random access memory (RAM). For example, a basic input/output system (BIOS), containing the basic routines that help to transfer information, such as during start-up, is typically stored in ROM.

Networked computer 205 may also include other devices and components (not shown), such as, but not limited to a hard disk drive or other computer-readable storage, and I/O devices (e.g., a keyboard, mouse, and display), to name only a few examples. Still other devices and components may also be provided for the networked computer 205, as is readily apparent to one having ordinary skill in the art. These devices and components may be connected by appropriate interfaces. For example, serial devices may be connected (either externally or internally) to the networked computer 205 via serial ports 220a-c.

A serial controller 230 may be provided to handle asynchronous serial communications between the processor 210 and one or more serial device (e.g., the serial devices 140 in FIG. 1) connected via the serial port(s) 220a-c. In an exemplary embodiment, the serial controller 230 may be implemented as a universal asynchronous receiver-transmitter (UART). It is noted, however, that any suitable serial controller may be implemented, and the systems and methods described herein are not limited to use with a UART.

Networked computer 205 may operate in a networked environment using logical connections to one or more remote computers (e.g., via communications network 110 in FIG. 1). For example, the remote computer may be a personal computer, a server, a router, a network PC, a peer device or other common network node. Accordingly, networked computer 205 may include adapter hardware and software to enable a connection to the communication network. In an exemplary embodiment, networked computer 205 may be connected to the network through a network interface or adapter 240 when used in a LAN networking environment. When used in a WAN networking environment (e.g., the Internet), networked computer 205 may include a modem or other means for establishing communications over the network.

It is noted that networked computer 205 may implement any number of network adapters 240 to provide as many connections to communication network as the hardware and software support. It will be appreciated that the network connections described above are exemplary and other means of establishing a communications link between the computers may be used.

Networked computer 205 may also include a management processor 250 and program code 260 executable by the management processor 230 to make the serial ports 220a-c available to other computer and/or devices over the network. A local bus 270 (or other connection) may couple the serial ports 220a-c directly to the network adapter 240 via the management processor 250, thereby bypassing UART 230. Instead of operating via the local UART 230, the management processor 250 handles the connection with the serial ports. This connection may be enabled by hardware and/or software/firmware provided in the management processor 250 (e.g., the management processor 250 is provided with UART capabilities). The bus represents one or more of any of several types of structures, and may be implemented using any of a variety of communication architectures.

In an exemplary embodiment, management processor 250 may be implemented, e.g., using the Integrated Lights-Out (iLO) intelligent management processor integrated on most ProLiant® server computers commercially available from Hewlett-Packard Company (Palo Alto, Calif. USA). The iLO management processor provides a virtual presence (i.e., complete control regardless of the server status or location). The iLO management processor is currently available as iLO Standard and iLO Advanced. The iLO Standard management processor provides basic system board management functions and diagnostics. The iLO Advanced management processor provides these features plus support for remote administration. It is noted, however, that the management processor 250 is not limited to use with the iLO management processor, and other management processors now available or later developed may also be implemented.

Program code 260 may be stored on various types of computer-readable media (e.g., ROM, RAM, flash memory, etc.) operatively associated with the management processor 250. In exemplary embodiments, the management processor 250 functions independent of the operating system (OS) for the networked computer, enabling network access to the serial port(s) even if the networked computer is powered off or otherwise unavailable (e.g., in an auxiliary state). For example, the program code 260 may be implemented as firmware which may continue to be executed by the management processor via auxiliary power even if the main power has been shut off. The interfaces (e.g., network adapter and serial ports) may also continue to operate on the auxiliary power. Accordingly, the program code 260 may continue to support an out-of-band serial connection with the at least one serial port.

The term "in-band" and "out-of-band" as used herein refer to alternate modes of operation, with in-band being the standard or typical mode of operation, and out-of-band being used when the in-band mode of operation is unavailable. By way of example, software on the OS may be implemented as the in-band mode of operation for communicating with the serial port(s) and connected devices. If the OS fails or the server is powered-off, the management processor and firmware enables out-of-band serial communication.

During operation, the program code 260, including computer-readable instructions, data structures, program modules and/or other data, may be accessed by the management processor 250 for execution. Exemplary implementations of a management processor and program code for making serial ports of existing computers available over a network are described in more detail below with reference to FIG. 3.

Figure 3:
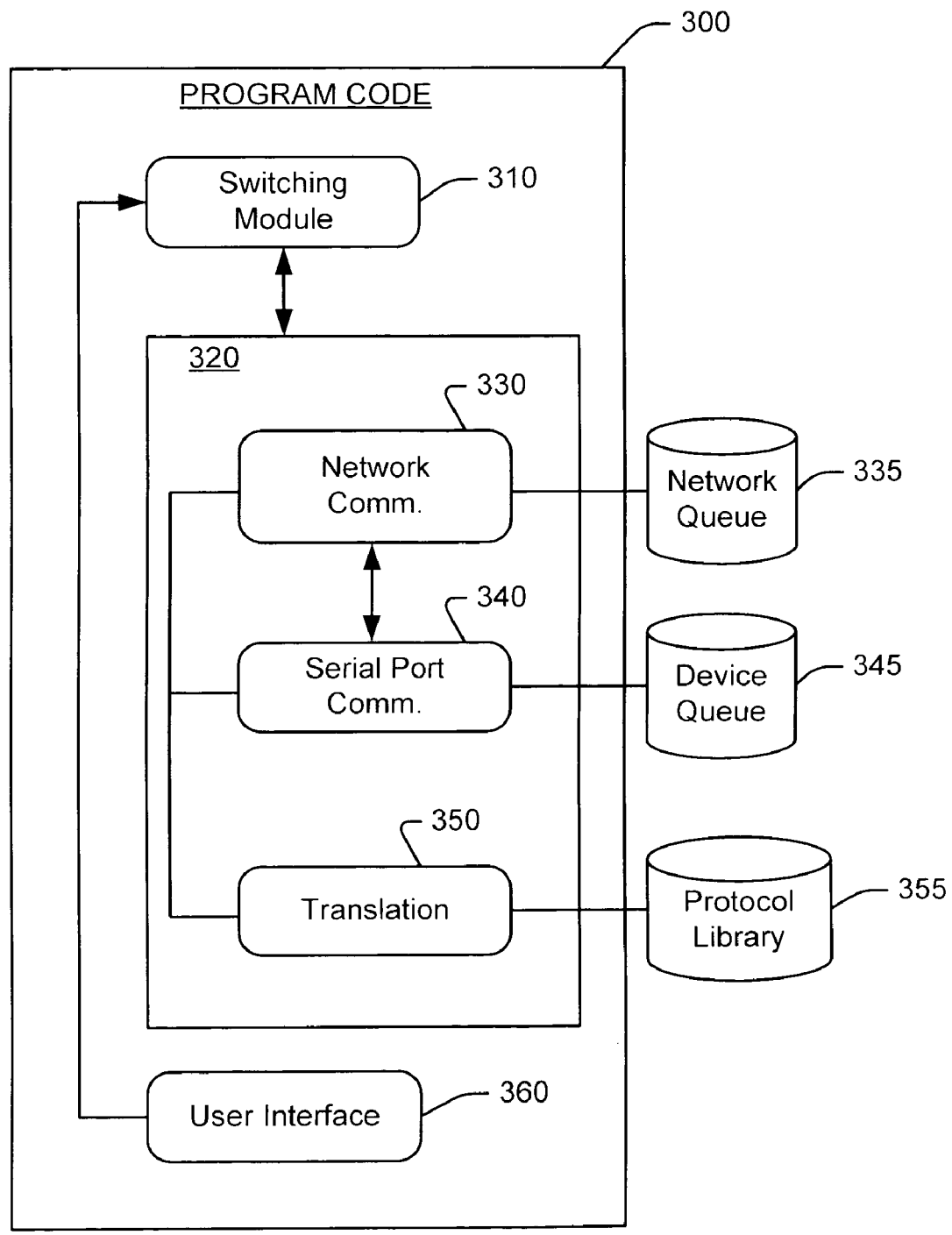
FIG. 3 is a functional block diagram of exemplary program code for making serial ports of existing computers available over a network.

FIG. 3 is a functional block diagram of exemplary program code 300 (e.g., firmware) for making serial ports of existing computers available over a network. Exemplary program code 300 includes computer-readable instructions that may be stored in memory and executed by a management processor (e.g., the management processor 250 in FIG. 2) to implement the functions described herein.

Program code 300 may include various functional modules, such as, e.g., a switching module 310 and network control modules 320. Switching module 310 includes instructions for removing or disabling the UART or other local serial controller for the serial ports so that the management processor can control the serial ports exclusive of the local serial controller. In an exemplary embodiment, the switching module 310 instructs the management controller to physically disconnect the local serial controller from the serial ports (e.g., via mechanical, electrical, or optical switching). Alternatively, the switching module 310 may instruct the management controller to intercept communications between the serial ports and the local serial controller, thereby logically disconnecting the local serial controller from the serial ports. After removing local control of the serial ports, switching module 310 may activate network control module 320 to make the serial ports available over the network.

In an exemplary embodiment, network control modules 320 may include network communications module 330 and port communications module 340. Network communications module 330 may be implemented to send and receive data packets on the communications network (e.g., via network adapter 240 in FIG. 2). Likewise, serial port communications module 340 may be implemented to communicate serial data with one or more serial device connected to the networked computer (e.g., via serial ports 220a-c in FIG. 2). Network communications module 330 and serial port communications module 340 may operate in conjunction to allow communications between the serial devices connected to the networked computer and other devices over the computer network (e.g., computer network 110 in FIG. 1). That is, data coming into the management processor from the network is sent to the serial port, and data coming into the management processor from the serial port is sent to a device connected on the network.

In an exemplary embodiment, network communications module 330 may be operatively associated with a network queue 335 for managing multiple data access requests. Likewise, serial port communications module 340 may be operatively associated with a device queue 345 for managing devices (e.g., device availability). In an exemplary embodiment, network queue 335 and device queue 345 may be implemented as one or more data structure. The use of queues for managing network traffic is well-known in the art and further description is not necessary.

In an alternative exemplary embodiment, network communications module 330 and serial port communications module 340 may be implemented to establish a dedicated connection between a networked computer and a serial device. In such an embodiment, the serial device appears as a local device to the networked computer. In addition, other devices may be precluded from accessing a serial device with a dedicated connection, thereby reducing or eliminating the need for managing network traffic.

Network control modules 320 may also include a translation module 350. Translation module 350 may be implemented to translate between serial data and network data (e.g., packetized data). Translation module 350 may be provided with a protocol library 355, including different communication protocols (e.g., serial and network communications protocols).

In an exemplary embodiment, translation module 350 may be implemented to establish a secure network connection between one or more devices on the communications network and one or more of the serial devices. A secure network connection may be established using secure protocols, such as, e.g., SSH or TELNET secure protocols.

In an exemplary embodiment, the program code 300 may include an optional user interface (UI) module 360. UI module 360 may be implemented to interact with a user in a graphical user interface operating environment. UI module 360 may receive input and deliver output via ancillary hardware (e.g., keyboard, monitor, printer, scanner), and/or interact with other functional modules to enable a user to select between network support and local support of the serial port(s). Accordingly, one or more of the serial port(s) may be made available for network access, but if desired, the user may return control of the serial ports to the local serial controller (e.g., UART 230 in FIG. 2).

Although exemplary program code is described with reference to FIG. 3 as including various functional modules, it is noted that the program code is shown and described herein merely for purposes of illustration and is not limited to any particular implementation. For example, the modules described above do not need to be encapsulated as separate functional components. In addition, other functional components may also be provided and are not limited to those shown and described herein.

Before continuing, it is noted that the exemplary embodiments discussed above are provided for purposes of illustration. Still other embodiments are also contemplated.

Exemplary Operations

FIG. 4 is a flowchart illustrating exemplary operations for making serial ports of existing computers available over a network. Operations 400 may be embodied as logic instructions (e.g., program code or firmware) on one or more computer-readable medium. When executed, the logic instructions implement the described operations. In an exemplary embodiment, the components and connections depicted in the figures may be used for making serial ports of existing computers available over a network.

In operation 410, a networked computer is identified with at least one serial port. For example, this may be accomplished by manual inspection of the computers provided on a computer network. In another example, this may be accomplished automatically, e.g., using software for identifying serial ports at the computers provided on a computer network. In operation 420, a mode of operation may be selected (e.g., local control mode or a network access mode).

In operation 430, a determination is made whether to operate the serial port under local control or make it available via the network. If network access to the serial port is not selected, operations may end at 440, or return to operation 410 to identify other networked computers with at least one serial port.

If network access to the serial port is selected, control of the serial port is remove from a local serial controller at the networked computer in operation 450. In operation 460, network support is provided for the serial port so that other network devices may access the serial port. Operations may then end at 440, or operation 410 return to identify other serial ports.

The operations shown and described herein are provided to illustrate exemplary embodiments for making serial ports of existing computers available over a network. It is noted that the operations are not limited to the ordering shown. In addition, not all of the operations need to be implemented. For example, operations 410, 420, and the determination at 430 are optional and may be omitted. Still other operations may also be implemented to make serial ports of existing computers available over a network.

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A system for making serial ports of existing computers available over a network, comprising:
   a serial controller for locally controlling at least one serial port of a networked computer; and
   a management processor operatively associated with the networked computer and operable in both a first mode and a second mode, the management processor operating in the first mode to disable local control of the at least one serial port by the serial controller, the management processor taking control of the at least one serial port for network access in the first mode, and the management processor operating in the second mode to return control of the at least one serial port to the serial controller.

2. The system of claim 1 wherein the management processor operating in the first mode manages communications with the at least one serial port exclusive of the serial controller.

3. The system of claim 1 further comprising a user interface for selecting between network support for the at least one serial port and local support for the at least one serial port.

4. The system of claim 1 further comprising program code executable by the management processor, the program code converting serial communications from the at least one serial port into a secure network protocol.

5. The system of claim 1 wherein the management processor is operational independent of an operating system for the networked computer.

6. The system of claim 1 wherein the at least one serial port is available for network access even if the networked computer is powered off.

7. A method for making serial ports of existing computers available over a network, comprising:
   selecting from two operational modes for at least one serial port of the networked computer;
   in a first mode, removing control of the at least one serial port from a serial controller at a networked computer;
   in the first mode, providing network access to the at least one serial port exclusive of the serial controller; and
   in a second mode, returning control of the at least one serial port to the serial controller at the networked computer.

8. The method of claim 7 further comprising establishing a dedicated connection between a serial device connected to the at least one serial port and another network device.

9. The method of claim 8 wherein the serial device appears as a local device to the network device.

10. The method of claim 7 further comprising identifying the networked computer with the at least one serial port.

11. The method of claim 7 wherein removing control of the at least one serial port from the serial controller is by logically disconnecting the serial controller from the at least one serial port.

12. The method of claim 7 further comprising establishing a secure connection between the at least one serial port and another network device.

13. The method of claim 7 further comprising translating serial communications from the at least one serial port to a secure network protocol.

14. The method of claim 7 further comprising providing network access to the at least one serial port independent of an operating system executing on the networked computer.

15. The method of claim 7 further comprising providing network access to the at least one serial port even if the networked computer is powered off.

16. A system for making serial ports of existing computers available over a network, comprising:
   means for selecting from two operational modes;
   means for removing control of at least one serial port from a serial controller in a first operational mode;
   means for making the at least one serial port available over the network exclusive of the serial controller in the first operational mode; and
   means for returning control of the at least one serial port to the serial controller in a second operational mode.

17. The system of claim 16 further comprising means for establishing an out-of-band serial connection with the at least one serial port, the out-of-band serial connection being used when an in-band mode of operation is unavailable.

18. The system of claim 16 further comprising means for providing network access to the at least one serial port even if the networked computer is powered off.

* * * * *